G. F. J. Colburn,
Stop Hinge,
Nº 44,076. Patented Sept. 6, 1864.

Witnesses
A. G. P. Colburn
J. G. Leffingwell

Inventor
George F. J. Colburn

UNITED STATES PATENT OFFICE.

GEORGE F. J. COLBURN, OF NEWARK, N. J., ASSIGNOR TO THE SCOVILLE MANUFACTURING COMPANY, OF WATERBURY, CONN.

IMPROVED STOP-HINGE.

Specification forming part of Letters Patent No. 44,076, dated September 6, 1864.

*To all whom it may concern:*

Be it known that I, GEORGE F. J. COLBURN, of the city of Newark, county of Essex, State of New Jersey, have invented a new and Improved Mode of Constructing a Stop-Hinge; and I do hereby declare that the following is a full and exact description of the same, reference being had to the accompanying drawings, making a part of this specification.

Figure 2:
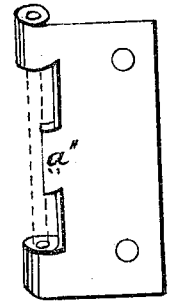
Figure 3:
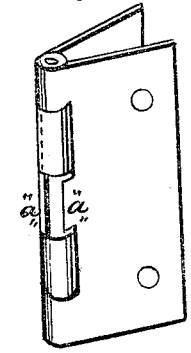
Figure 1:
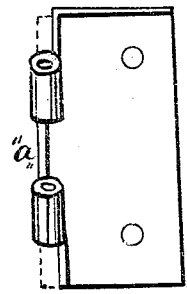

Figure 1 represents one leaf of the hinge; Fig. 2, the other leaf. These leaves show the peculiar construction of my hinge. Fig. 3 is a perspective view of both leaves united by a pintle and partly opened, showing the peculiar construction of the stops.

Letters $a$ $a$ refer to that part of the leaves of the hinge formed into stops.

The nature of my invention consists of so constructing the two leaves of a hinge that when united by a pintle or wire in the usual manner they will constitute a stop-hinge, allowing of the leaves being set at any required angle.

To enable those skilled in the art to construct and use my invention, I will proceed to describe its construction and operation.

I make the hinge of metal, of two parts, similar in form to the hinge in common use, with this exception that in forming or blanking out the two leaves, instead of forming all the usual projections into eyes to receive the pintle, I so construct the leaves that they shall have, besides the projections for the eyes, a separate projection or projections to form into stops. These projections are seen at letters $a$ $a$, Figs. 1, 2.

Figure 4:
Figure 5:
Figure 6:

It will be seen by reference to the drawings, Fig. 1, 2, letters $a$ $a$, that the projections forming the stops are made from the same portion of which the whole blank is formed in the one case, Fig. 1, by leaving a portion of the metal projecting between the eyes, and in Fig. 2 by a projection left between the eyes, instead of the third eye usually formed in the same position. These projections can be slightly curved or rounded on the outside and inside, like the eye portions, to fit the round of the pintle and give a roundness to the back of the whole hinge. The two leaves of the hinge are joined together by a pintle or wire inserted through the eye portions in the usual manner. Fig. 3 represents the hinge when thus united, letters $a$ $a$ showing the relative position of the stops to each other when the leaves of the hinge are partly opened. The angle of opening will be in the ratio to the length or shortening of the stops. Fig. 4 shows a cross-section of the hinge, the leaves being together and the stops apart; Fig. 5, a section of the hinge, the leaves open and the stops meeting at a right angle. Fig. 6 shows a modified form of Fig. 5.

In constructing a hinge in the manner and for the purpose set forth I have limited myself in description to the formation of only one stop on each half of the hinge in the middle or between the eye portions. Such formation or construction is susceptible of being modified, if so desired, without altering the principle on which the hinge is constructed and acts. As, for instance, more than one stop can be made and used on each half of the hinge formed in the manner I have described, and instead of being located between the eye portions may be made at each end of the blank, and the eyes in the middle between the stops. Such modification may be sometimes necessary.

Having thus fully described the construction and operation of my invention, I will state some of its advantages over other stop-hinges in general use.

First. My hinge can be so constructed as to present a rounded back, the stops when the hinge is closed being flush with the surface, thus obviating the objections that often occur in using hinges with a projecting stop.

Second. The hinge can be made as cheap, if not cheaper, than the ordinary butt-hinge of the same size.

Having thus described the construction and operation of my invention, I would state that I am aware that stop-hinges have been made similar in their operation to my invention, but differing materially in their construction, as in the case of the English patent of Messrs. Bishop and Dyer, the peculiar construction of which I disclaim.

What I do claim, and desire to secure by Letters Patent, is—

A hinge having one or more stops, formed as described.

GEORGE F. J. COLBURN.

Witnesses:
JAMES H. DAYLAN,
J. G. LEFFINGWELL.